United States Patent
LoCasclo et al.

(10) Patent No.: US 6,611,640 B2
(45) Date of Patent: Aug. 26, 2003

(54) OPTICAL DISPERSION COMPENSATOR

(75) Inventors: Michael LoCasclo, Albany, NY (US); Clinton T. Ballinger, Burnt Hills, NY (US); Daniel P. Landry, Clifton Park, NY (US)

(73) Assignee: Evident Technologies, Troy, NY (US)

( * ) Notice: Subject to any disclaimer, the term of this patent is extended or adjusted under 35 U.S.C. 154(b) by 0 days.

(21) Appl. No.: 09/781,984

(22) Filed: Feb. 14, 2001

(65) Prior Publication Data
US 2002/0041736 A1 Apr. 11, 2002

Related U.S. Application Data

(60) Provisional application No. 60/237,644, filed on Oct. 3, 2000.

(51) Int. Cl.⁷ .............................................. G02B 6/26
(52) U.S. Cl. ...................... 385/27; 385/123; 359/337.5; 359/339
(58) Field of Search ............... 385/27, 123; 359/337.5, 359/339

(56) References Cited

U.S. PATENT DOCUMENTS

| | | | |
|---|---|---|---|
| 4,750,802 A | 6/1988 | Bhagavatula | 350/96.15 |
| 5,222,161 A * | 6/1993 | Chang et al. | 372/12 |
| 5,361,319 A | 11/1994 | Antos et al. | 385/123 |
| 5,473,719 A | 12/1995 | Stone | 385/123 |
| 5,802,234 A | 9/1998 | Vengsarkar et al. | 385/123 |
| 6,055,081 A | 4/2000 | Koyano et al. | 359/161 |
| 6,128,118 A | 10/2000 | Marcenac | 359/173 |
| 6,137,604 A | 10/2000 | Bergano | 359/124 |
| 6,148,127 A | 11/2000 | Adams et al. | 385/37 |
| 6,274,323 B1 | 8/2001 | Bruchez et al. | 435/6 |
| 6,288,835 B1 * | 9/2001 | Nilsson et al. | 359/341.3 |

* cited by examiner

Primary Examiner—Robert H. Kim
Assistant Examiner—George Y. Wang
(74) Attorney, Agent, or Firm—Kenyon & Kenyon

(57) ABSTRACT

An optical dispersion compensator includes a saturable absorber. Coupled to the saturable absorber is a pre-amplifier and a post-amplifier. The saturable absorber compresses optical pulse signals based upon the amplitude envelope of the optical pulse in order to prevent optical dispersion.

23 Claims, 10 Drawing Sheets

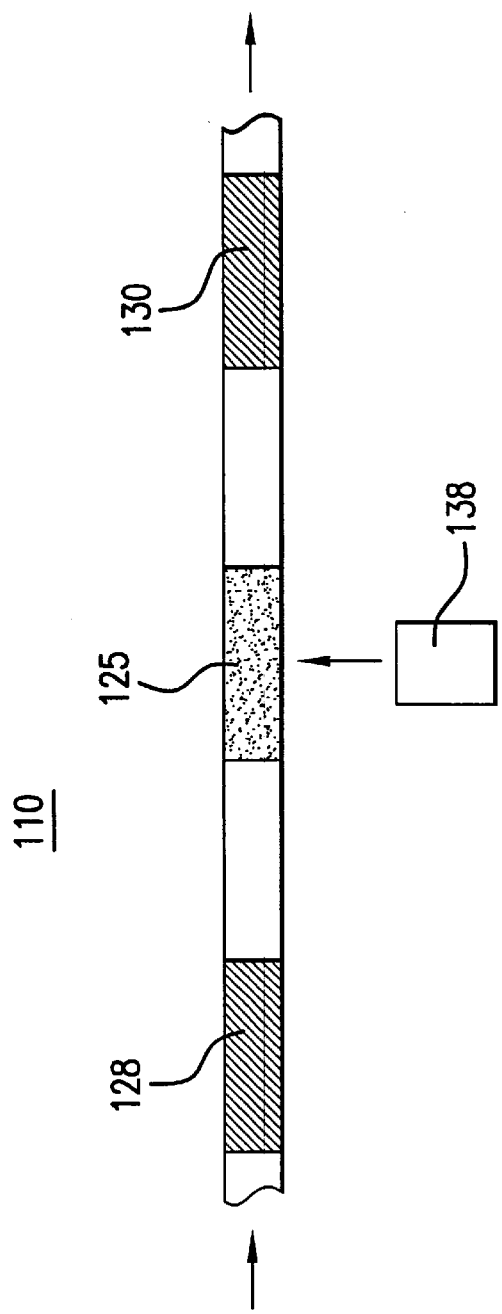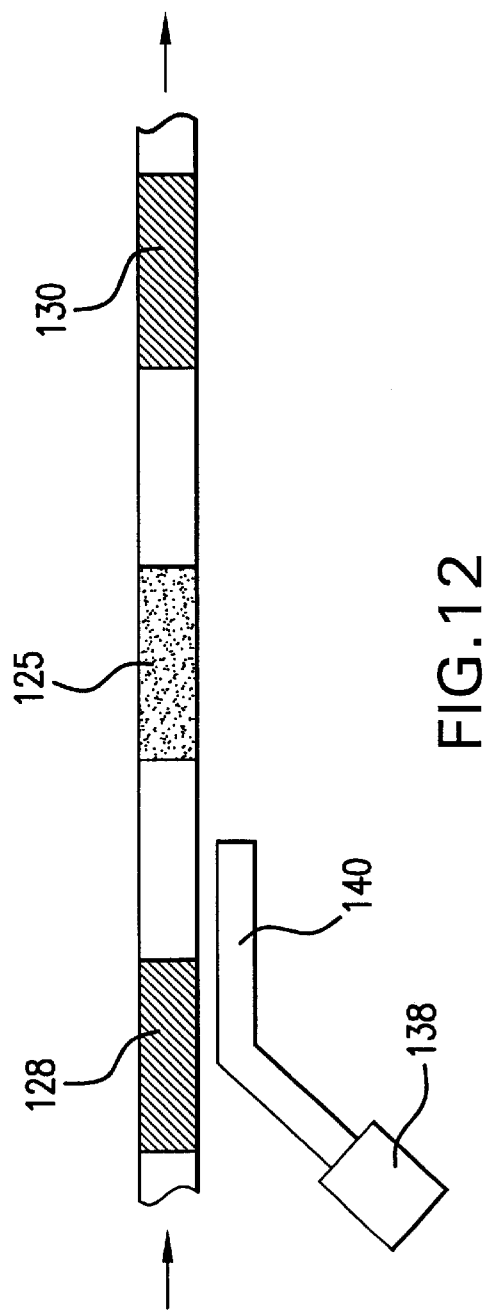

OPTICAL DISPERSION COMPENSATOR

CROSS-REFERENCES TO RELATED APPLICATIONS

This application claims the benefit of U.S. Provisional Application Ser. No. 60/237,644, filed Oct. 3, 2000.

FIELD OF THE INVENTION

The present invention is directed to optical communications. More particularly, the present invention is directed to an optical dispersion compensator.

BACKGROUND INFORMATION

The characteristics of an optical fiber affect the nature of a signal pulse as it traverses the fiber. A major concern, especially in long-haul optical networks, is optical pulse dispersion. Optical pulse dispersion in an optical communication network causes optical signal pulses to spread out in the time domain.

Optical pulse dispersion is primarily caused by the differences of the propagation velocity of wavelength components, optical modes, or polarization comprising the optical pulse. Dispersion leads to intersymbol interference in which the optical pulses spread out and overlap one another, thus making it impossible for the detection of the individual pulses. In order to counter the effects of intersymbol interference it is required that the pulses be spaced further apart, which directly limits the possible data rate.

One method of avoiding optical dispersion is by using dispersion shifted fiber that prevents dispersion at a certain wavelength. For example, most dispersion shifted fiber is designed with a dispersion zero point around 1550 nm. However, the main drawback with dispersion shifted fiber is that it cannot be used where the fiber has already been installed. Digging up a few hundred kilometers of roadway to replace fiber types is extremely costly. Further, if wavelength division multiplexing ("WDM") is being used, the problems of four-wave mixing effectively prohibit the use of dispersion shifted fiber.

Various other methods have been proposed and implemented to counter the effects of optical dispersion, thus allowing for higher data rates than otherwise allowed. These methods typically provide for dispersion compensators to be inserted at intervals along a fiber. Dispersion compensators cancel the pulse dispersion that has occurred.

One type of dispersion compensator is dispersion compensating fiber. Dispersion compensating fiber has its core profile controlled to counteract dispersion. For example, in order to equalize an installed fiber link with dispersion at 1550 nm of 17 ps/nm/km (standard fiber) a shorter length of compensating fiber can be placed in series with it. The compensating fiber typically has a dispersion of −100 ps/nm/km in the 1550 nm wavelength band. Because the dispersion acts in the opposite direction to the dispersion of the standard fiber the compensating fiber "undisperses" the signal. Therefore, a 100 km length of standard fiber for operation at 1550 nm can be compensated by connecting it to 17 km of compensating fiber.

However, in most circumstances the existing optical fiber has already been installed, so the added length of fiber sits at one end of the link on a drum. This adds to attenuation and additional amplification may be needed to compensate for the compensating fiber. Compensating fiber has typical attenuation of 0.5 dB/km. In addition, the narrow core of dispersion compensating fiber makes it more susceptible to non-linear high power effects than standard fiber and it is also polarization sensitive.

Another method to reduce optical dispersion is mid-span spectral inversion, which requires inserting a device in the middle of the optical link to invert the spectrum. This process changes the short wavelengths to long ones and the long wavelengths to short ones. If the spectrum is inverted in the middle of the link (using standard fiber) the second half of the link acts in the opposite direction. When the optical pulse arrives, it has been rebuilt exactly compensated for by the second half of the fiber.

One problem with mid-span spectral inversion is that it is difficult to implement in all situations because an active device has to be placed into the middle of the fiber link. This may or may not be practical. In addition, mid-span spectral inversion "undoes" the effect of stimulated Raman scattering in WDM links, thus causing amplification problems.

Another know method for reducing optical dispersion is the use of chirped Fiber Bragg Gratings. In a chirped Fiber Bragg Grating, the spacing of the lines on the gratings vary continuously over a small range. Shorter wavelength light entering the grating travels along it almost to the end before being reflected. Longer wavelength light is reflected close to the start of the grating. Therefore, short wavelengths are delayed in relation to longer ones. Since the pulse has been dispersed such that short wavelengths arrive before the long ones, the grating can restore the original pulse shape and undo the effects of dispersion.

However, chirped Fiber Bragg Gratings need to be quite long. For single-channel application, up to 20 cm is commonly required. In a WDM system a fully continuous chirp would require a very long grating. To compensate for 100 km of standard (17 ps/nm/km) fiber the chirped grating needs to be 17 cm long for every nm of signal bandwidth. Therefore, a WDM system with channels spread over 20 nm would need a chirped Fiber Bragg Grating 340 cm long. Long Fiber Bragg Gratings are very difficult to construct.

Another problem with chirped Fiber Bragg Gratings is that they have a ripple characteristic in the Group Velocity Dispersion they produce. This ripple can be a source of transmission system noise. The longer the grating the larger the problem with ripple and its resultant noise. In addition, short Fiber Bragg Gratings are filters. When a signal is processed through many stages of filtering, the signal gets very narrow and distorted, and can also have increased noise.

Based on the foregoing, there is a need for an improved optical dispersion compensator.

SUMMARY OF THE INVENTION

One embodiment of the present invention is an optical dispersion compensator that includes a saturable absorber. Coupled to the saturable absorber is a pre-amplifier and a post-amplifier.

BRIEF DESCRIPTION OF THE DRAWINGS

FIG. 11 is a side view of an optical dispersion compensator in accordance with another embodiment of the present invention.

FIG. 12 is a side view of an optical dispersion compensator in accordance with another embodiment of the present invention.

DETAILED DESCRIPTION

One embodiment of the present invention is an optical dispersion compensator that includes a saturable absorber. In contrast to the known dispersion compensators that utilize methods for delaying specific wavelength components that comprise the optical pulse in order to achieve pulse compression, the present invention operates independently of the wavelength composition of the optical pulse. Instead, the present invention utilizes the saturable absorber to compress signals based upon the amplitude envelope of the optical pulse.

Figure 1:
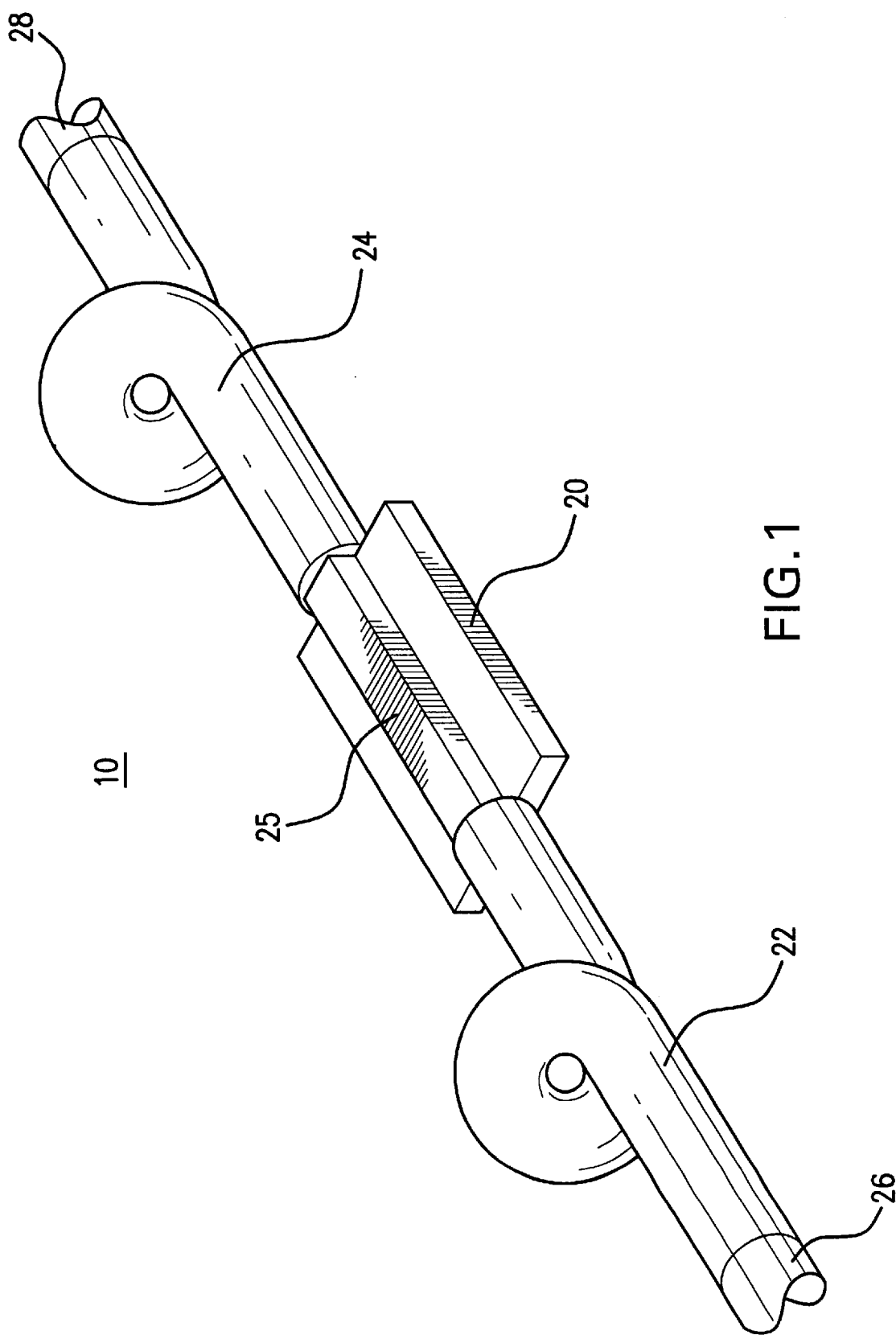
FIG. 1 is a perspective view of an optical dispersion compensator in accordance with one embodiment of the present invention.

FIG. 1 is a perspective view of an optical dispersion compensator in accordance with one embodiment of the present invention. Optical dispersion compensator 10 includes saturable absorber material ("SA material") 25 formed on a substrate 20 as a linear waveguide using conventional thin film processing techniques. Coupled to an input of SA material 25 is an optical pre-amplifier 22. Coupled to an output of SA material 25 is an optical post-amplifier 24. The input signal is carried on an input optical fiber 26 coupled to pre-amplifier 22. The output signal is carried on an output optical fiber 28 coupled to post-amplifier 24.

In one embodiment, the input signal is a light source carrying optical information in the 1550 or 1300 nm wavelength regions. Amplifiers 22 and 24 are rare-earth doped fiber-type amplifiers (e.g., Erbium-doped Fiber Amplifiers ("EDFAs")), Semiconductor optical amplifiers ("SOAs") or Raman fiber amplifiers. Pre-amplifier 22 operates in the linear regime, which is in the unsaturated mode whereby the input optical signal is be amplified but not distorted. Post-amplifier 24 also operates in the linear regime.

SA material 25 has the property that high intensity light is absorbed less than low intensity light. Therefore, SA material 25 acts on an optical signal comprised of a Gaussian shaped pulse by absorbing the tails of the pulse more than the central region, effectively reducing the width of the pulse.

In general, a saturable absorber such as SA material 25 is a material that displays a reduction in the absorption coefficient at the operational wavelength with increased incident light intensity. The behavior of such a material can be modeled as a two state system, i.e., a system possessing two quantum states of different energies that an electron can exist in. In the natural state of the material, one in which no light is incident upon the material, all electrons lie in the lower energy state. An incident photon having a wavelength (hence energy) that corresponds to the energy difference between the quantum states will be absorbed if it excites an electron from the lower energy level to the upper energy level.

An electron in the upper state will drop back to the lower energy level in one of two ways. It can (1) spontaneously drop back and release energy as heat (referred to as "non-radiative recombination") or as a photon of the same wavelength that originally excited it (referred to as "spontaneous radiative recombination" or "spontaneous emission") or (2) interact with another photon, having the wavelength corresponding to the energy difference between quantum states, that forces the electron down to the lower energy level by the release of two photons (referred to as "spontaneous emission"). The average time the electron remains in the upper level (assuming the drop from the upper state to the lower state is by spontaneous recombination) is given by the relaxation constant ($\tau$).

At low light intensities there is a much higher probability of an electron being excited to an upper energy level than an electron being forced down to the lower energy level because at low light intensities very few electrons exist in the upper state. At higher light intensities a higher fraction of the electrons build up in the upper state. Because more electrons exist in the upper state there is a larger probability of an electron being forced to a lower energy level. At the limit (extremely high light intensities) an equal number of electrons exist in the upper state as in the lower state. At this point there is an equal probability of an electron in the lower energy levels jumping to the upper energy level (absorbing a photon) as an electron in the upper energy level interacting with a photon and dropping to the lower energy level releasing two photons. If both processes are considered there is no net reduction of the number of photons. Hence, the absorption falls to zero.

A saturable absorber such as SA material 25 differs from, for example, a non-linear material. As discussed, a saturable absorber involves the transitions of electrons between quantum states. In contrast, non-linear materials, instead of relying on transitions, involve the non-linear reaction due to the electric field of the photons at high photon fluxes (i.e., high light intensity). This reaction is called the electric polarization (P). Because a saturable absorber requires a transition between states, it is highly selective as to which wavelength it can operate in (i.e., only wavelengths that correspond to an electronic transition can saturate a saturable absorber).

The functionality of optical dispersion compensator 10 can best be explained by describing the action of SA material 25 on input optical signals and optical pulses. Input optical signals are typically comprised of a series train in time traveling down input fiber 26 of Gaussian (i.e., bell curved) shaped optical pulses, in which the presence of an optical pulse in a given time slot represents a logical "1" and the lack of an optical pulse in a given time slot represents a logical "0". Of course, the representation of the information is dependent upon the coding scheme. This description is of a typical on/off keying code.

The pulse shape can be described by the following equation:

$$I(t) = I_{max} e^{\left(\frac{-t^2}{2\sigma^2}\right)} \qquad \text{Eq. 1}$$

where I(t) is the intensity envelope of the optical pulse, $I_{max}$ is the maximum intensity at the center of the pulse, t is time and σ is the standard deviation in units of time.

Figure 2:
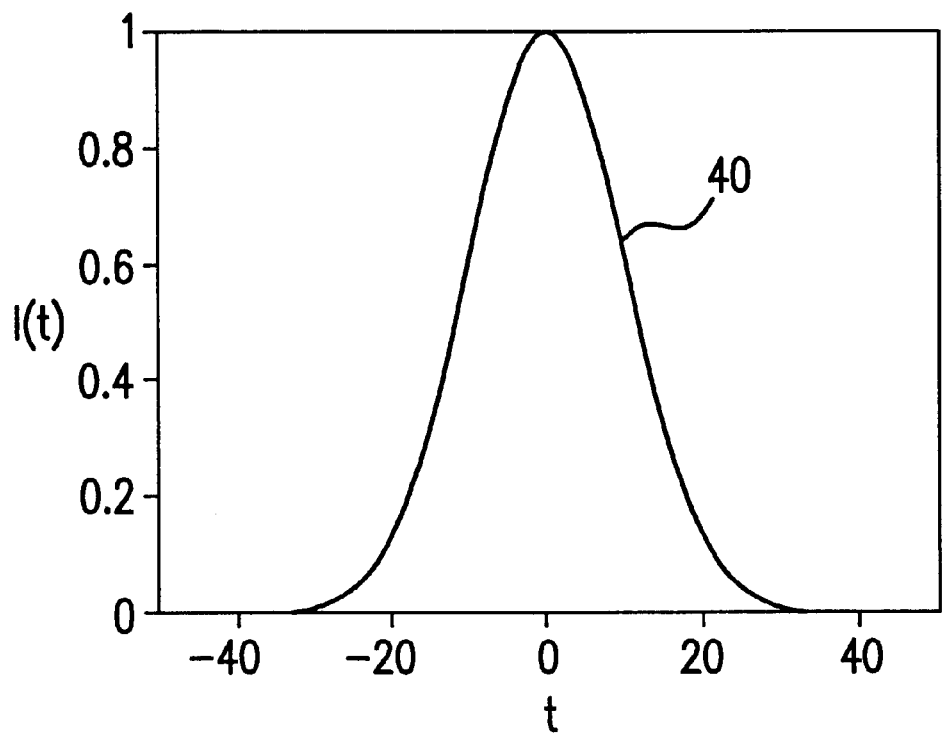
FIG. 2 is a graph illustrating a Gaussian shaped optical pulse.

For an optical communication system operating at 10 Gbps, a time slot of 100 picoseconds ($100 \times 10^{-12}$ s) is allotted for a pulse. Therefore, each pulse must be less than 100 ps. FIG. 2 is a graph illustrating a Gaussian shaped optical pulse 40.

A saturable absorber such as SA material 25 is an absorbing material in which the absorption coefficient of the material decreases as the intensity of the incident light increases. In general the absorption coefficient (α) can be described by the following equation:

$$\alpha = \alpha_0 \left(1 - 2\left(\frac{\sigma_0 I \tau}{h\nu + 2\sigma_0 I \tau}\right)\right) \qquad \text{Eq. 2}$$

where $\alpha_0$ is the low field absorption, $\sigma_0$ is the optical cross section, τ is the relaxation time, I is the light intensity, h is Planck's constant, and ν is the incident light frequency.

Eq. 2 illustrates that the intensity dependent absorption coefficient can be improved either by increasing the light intensity of the pulse (I) or by increasing the optical cross section of the saturable absorber material ($\sigma_0$). The intensity of the input optical signal can be increased by the use of an optical pre-amplifier such as optical pre-amplifier 22. Equally important is the improvement of the saturable absorber material by increasing the optical cross section. An increased cross section directly reduces the intensity required for a given level of saturation thus reducing the intensity required of the amplified signal and hence reducing the power demands and cost of the pre-amplifier.

Figure 3:
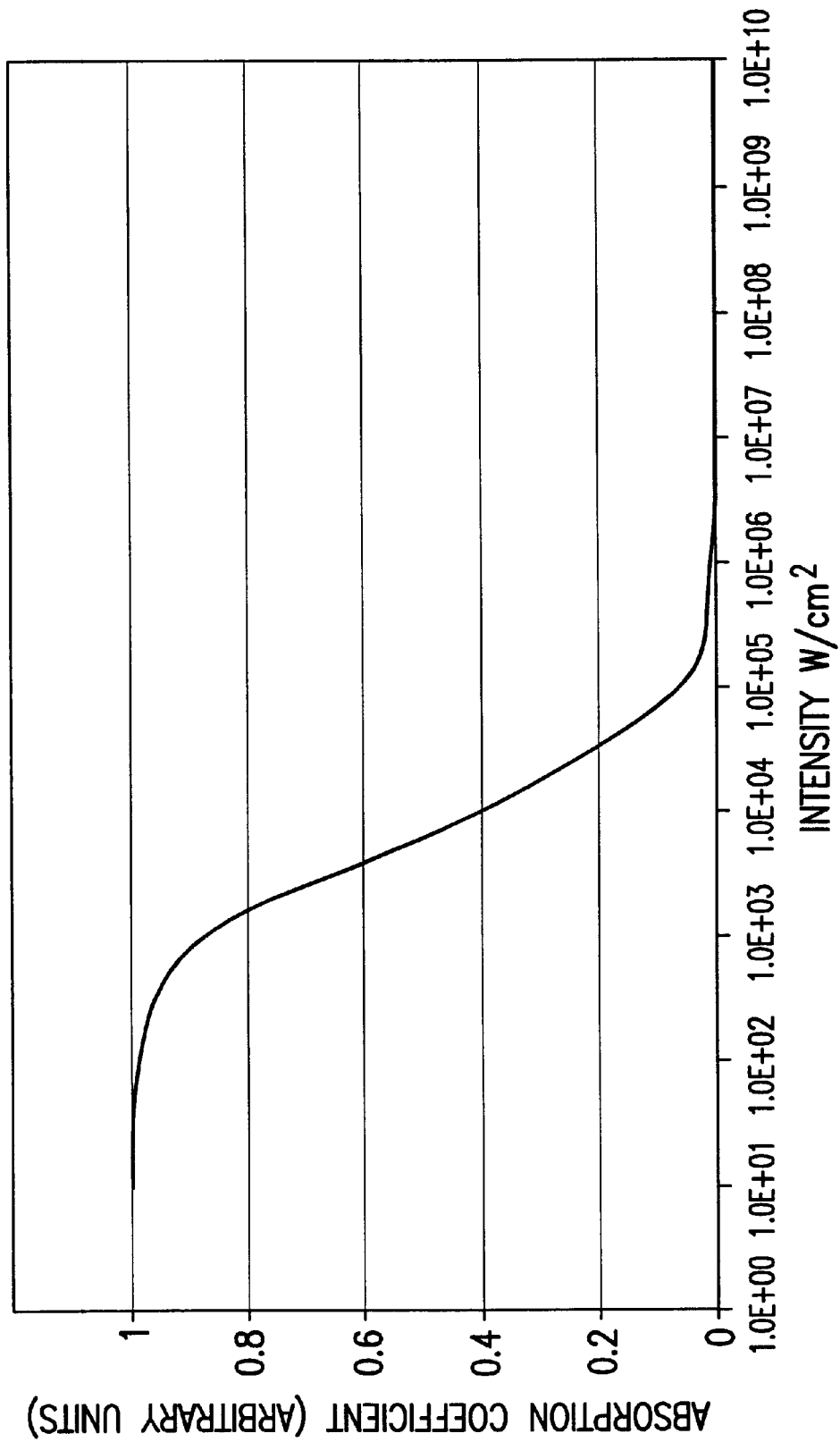
FIG. 3 is a graph illustrating the relation between optical intensity and absorption coefficient.

Eq. 2 can be further simplified by the insertion of the term $I_{sat}$ defined as the intensity at which the absorption coefficient drops to ½ its low field value and through the assumption that the response time of the saturable absorber is much less than the rise and fall times of the Gaussian shaped pulse. (The response times for saturable absorbers can range from less than 1 ps to greater than several hundred picoseconds. In one embodiment of the present invention, as will be described below, SA material 25 includes Lead Sulphide quantum dot doped glass and has a typical response time on the order of 2 picoseconds.) Using these terms, Eq. 2 can be simplified to:

$$\alpha = \frac{\alpha_0}{1 + \frac{I}{I_{sat}}} + \alpha_B \qquad \text{Eq. 3}$$

where $\alpha_B$ is the non-saturating background absorption. In the case of Quantum dot doped glasses, $\alpha_B$ is the absorption of the matrix material. This absorption is unaffected by the intensity of the optical signal. FIG. 3 is a graph illustrating the relation between optical intensity and absorption coefficient.

As the optical pulse travels through the saturable absorber material it is absorbed according to the equation:

$$I_{out}(t) = I_{in}(t) \times e^{-\alpha(I(t))L} \qquad \text{Eq. 4}$$

where $I_{out}$ is the intensity profile of the Gaussian shaped optical pulse after passing through the saturable absorber, $I_{in}$ is the intensity profile of the Gaussian shaped optical pulse before propagating through the saturable absorber and L is the length of the saturable absorber medium. By inserting Eq. 3 into Eq. 4, the equation describing the intensity profile of the optical pulse after passing through a saturable absorber material is attained:

$$I_{out}(t) = (I_{peak}) e^{\left(\frac{-t^2}{2\sigma^2}\right)} \times e^{\left(\frac{-\alpha_0 L}{1+\frac{(I_{peak})e^{\left(\frac{-t^2}{2\sigma^2}\right)}}{I_{sat}}} - \alpha_b L\right)} \qquad \text{Eq. 5}$$

Figure 4:
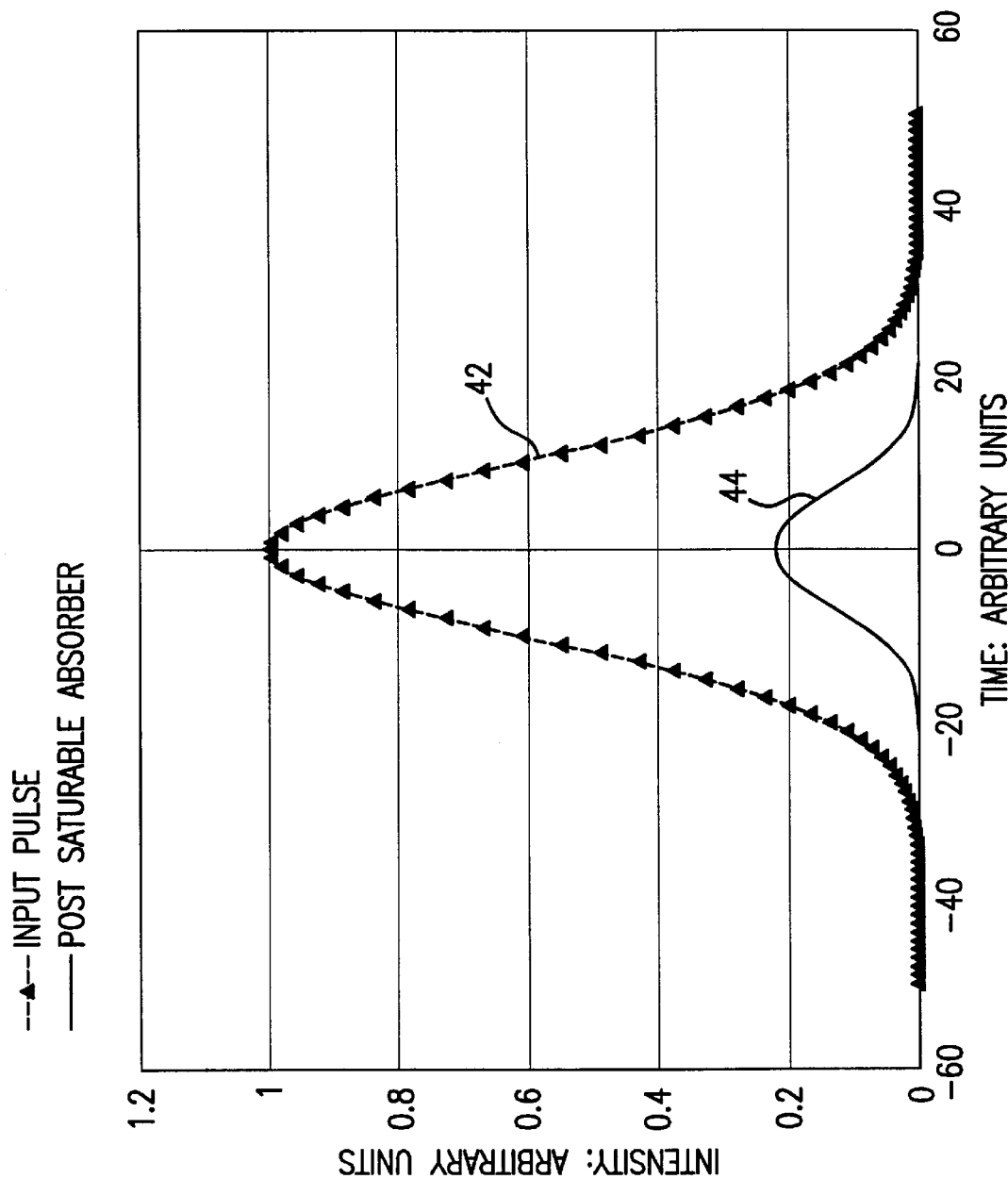
FIG. 4 is a graph illustrating the shape of an input optical pulse and the shape of an optical pulse after the input optical pulse passes through a saturable absorber.

FIG. 4 is a graph illustrating the shape of an input optical pulse 42 and the shape of an optical pulse 44 after input optical pulse 42 passes through the saturable absorber. Because all of the optical signal (center region and tails) are attenuated in the saturable absorber (although the central region is attenuated less than the tails) an optical post-amplifier such as optical post-amplifier 24 is used to boost the peak of the optical signal back up to point at which it was before passing through the saturable absorber.

Eq. 6 describes the intensity output of the peak of the optical pulse after passing through the saturable absorber:

$$I_{peakout} = (I_{peak}) e^{\left(\frac{-\alpha_0 L}{1+\frac{I_{peak}}{I_{sat}}} - \alpha_b L\right)} \qquad \text{Eq. 6}$$

Figure 5:
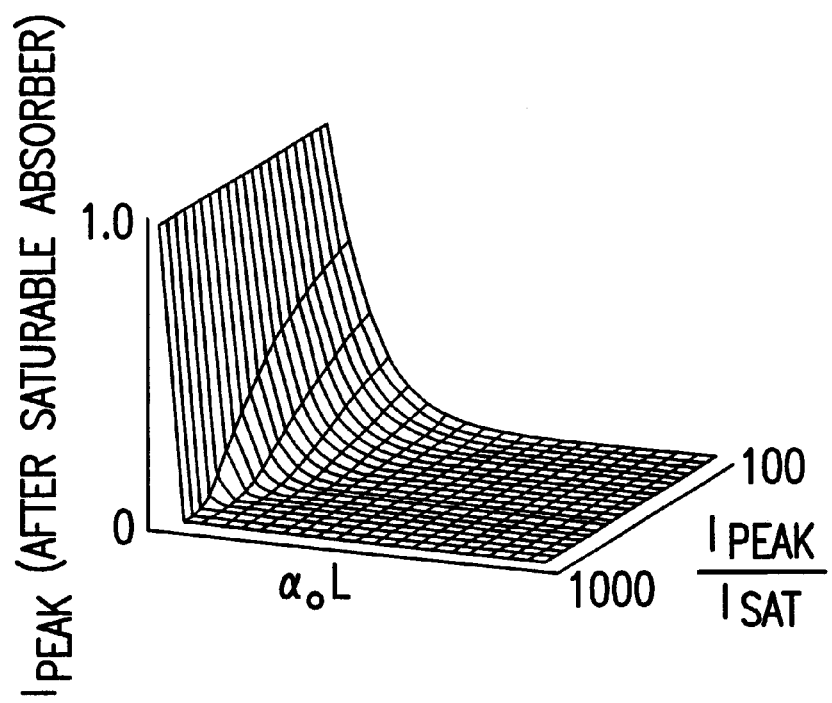
FIG. 5 illustrates a surface plot of the output intensity of the peak of the optical pulse as a function of $I_{peak}/I_{sat}$ and $\alpha_0 L$ assuming the background absorption $\alpha_b$ is equal to zero.

FIG. 5 illustrates a surface plot of the output intensity of the peak of the optical pulse as a function of $I_{peak}/I_{sat}$ and $\alpha_0 L$ assuming the background absorption $\alpha_b$ is equal to zero. If the optical pulse is amplified by the same amount that the peak of the optical pulse was attenuated, Eq. 7 describes the intensity of the optical pulse after the post amplifier:

$$I_{out} = (I_{peak}) e^{\left(\frac{-t^2}{2\sigma^2}\right)} \times e^{\left(\frac{-\alpha_0 L}{1+\frac{(I_{peak})e^{\left(\frac{-t^2}{2\sigma^2}\right)}}{I_{sat}}} - \alpha_b L\right)} \times e^{\left(\frac{\alpha_0 L}{1+\frac{I_{peak}}{I_{sat}}}\right)} \qquad \text{Eq. 7}$$

Figure 6:
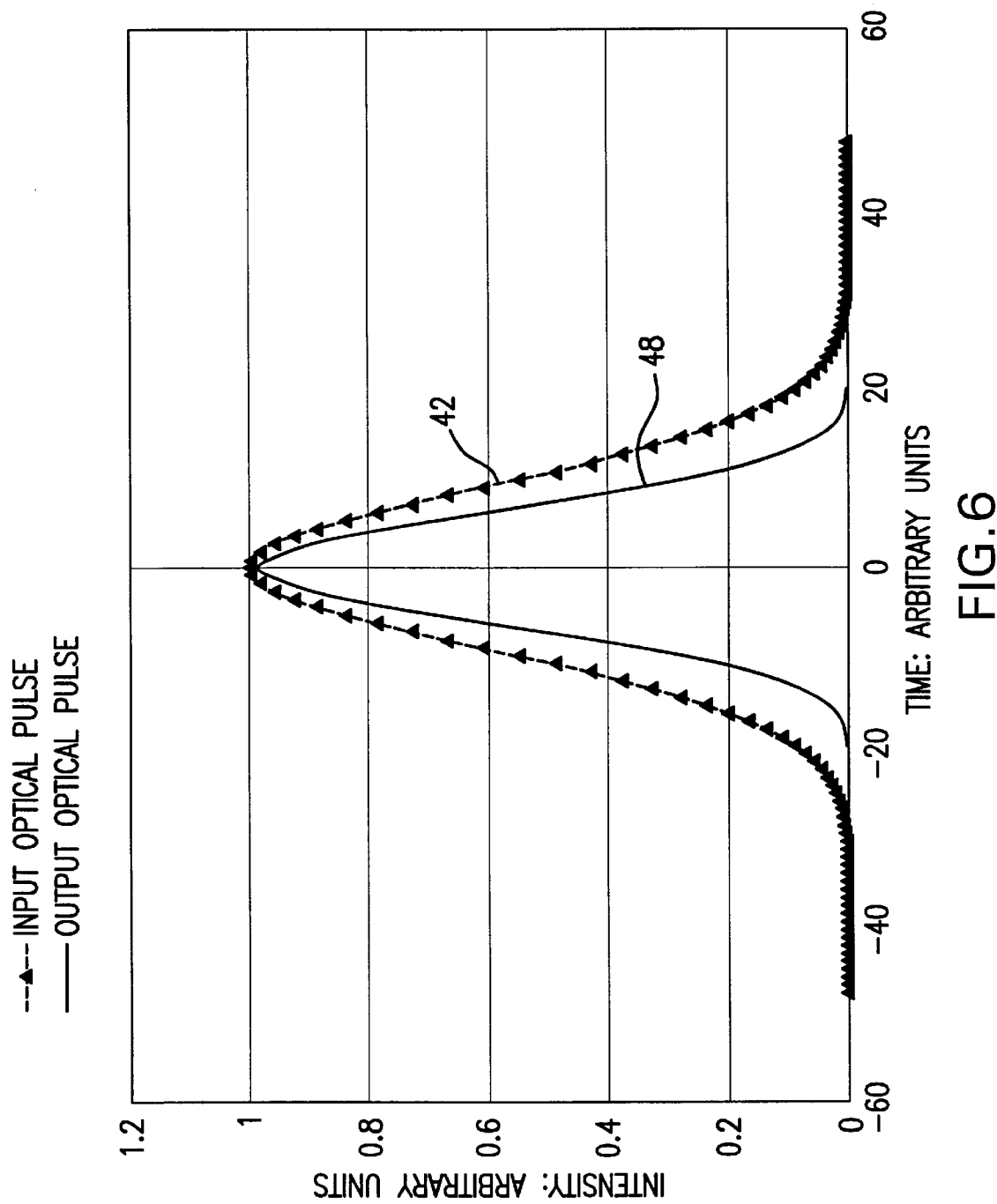
FIG. 6 is a graph illustrating the initial input optical pulse and an output optical pulse after post-amplification.

FIG. 6 is a graph illustrating the initial input optical pulse 42 and the output optical pulse 48 after post-amplification. The output optical pulse has been compressed compared with the input optical pulse. The Full Width Half Max of the output optical pulse is found by setting $I_{peak}/I_{sat}=$½ in Eq. 7 and solving for t (and multiplying by a factor of 2).

Figure 7:
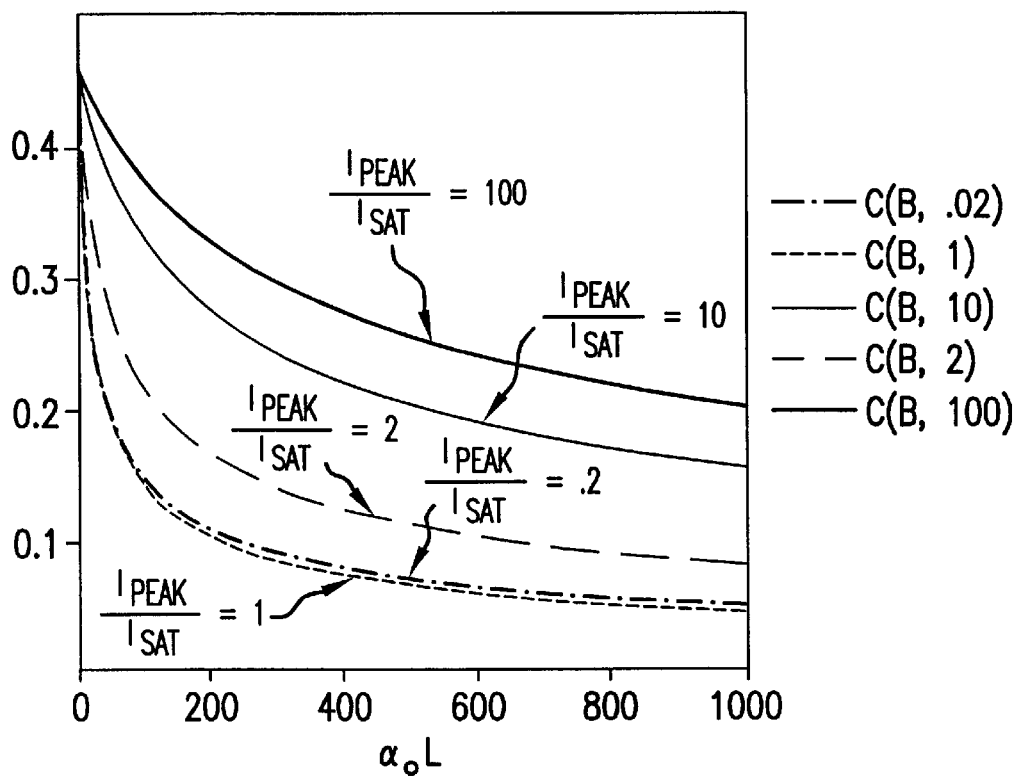
FIG. 7 is a graph illustrating the compression ratio vs. $\alpha_0 L$ for various values of $I_{peak}/I_{sat}$.
Figure 8:
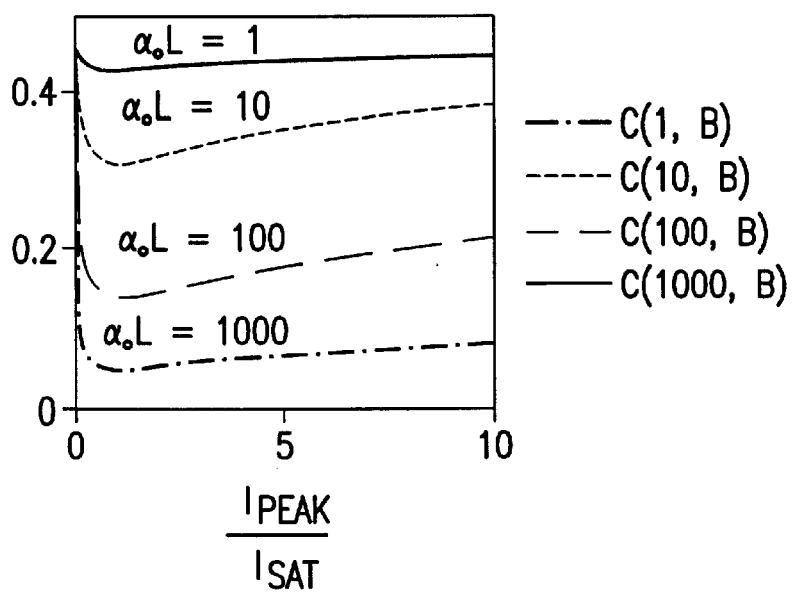
FIG. 8 is a graph illustrating the compression ratio vs. $I_{peak}/I_{sat}$ for various values of $\alpha_0 L$.
Figure 9:
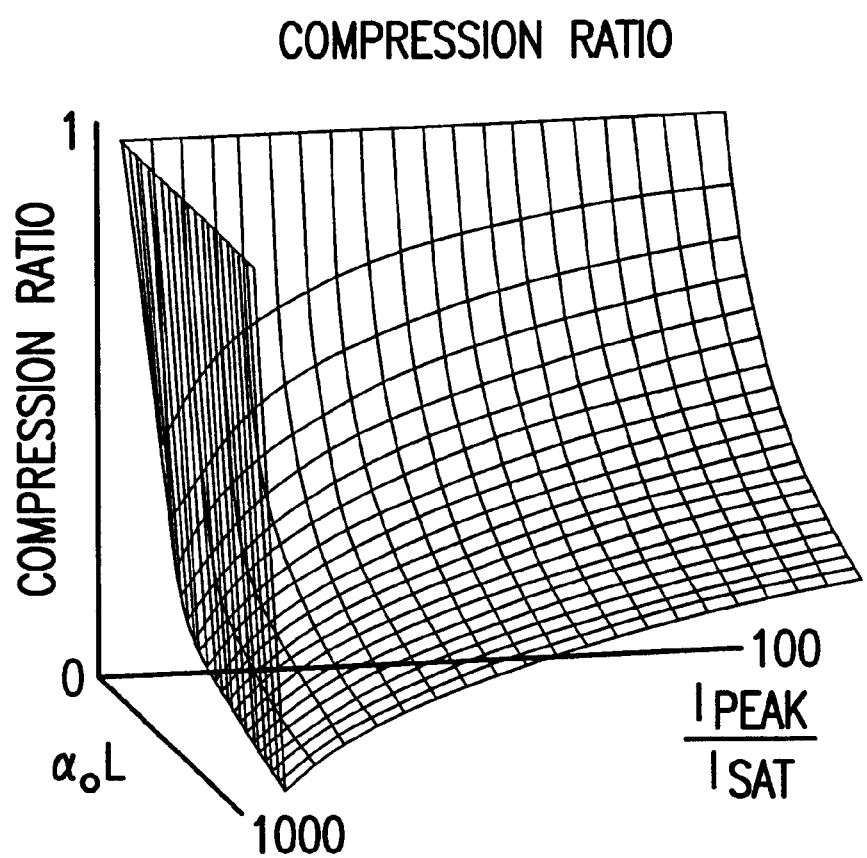
FIG. 9 is a surface plot of the compression ratio vs. $\alpha_0 L$ and $I_{peak}/I_{sat}$.

The compression ratio is defined as the factor by which the Full Width Half Maximum ("FWHM") of the input optical pulse is multiplied by in order to obtain the FWHM of the output pulse. The FWHM is defined as the full width of the optical pulse at half the peak of the same pulse. The compression factor is described by Eq. 8:

$$F_{comp} = \frac{t_{in} - t_{out}}{t_{in}} \qquad \text{Eq. 8}$$

where $F_{comp}$ is the compression ratio, $t_{in}$ is the FWHM of the input optical pulse, $t_{out}$ is the FWHM of the output optical pulse. FIG. 7 is a graph illustrating the compression ratio vs. $\alpha_0 L$ for various values of $I_{peak}/I_{sat}$. FIG. 8 is a graph illustrating the compression ratio vs. $I_{peak}/I_{sat}$ for various values of $\alpha_0 L$. FIG. 9 is a surface plot of the compression ratio vs. $\alpha_0 L$ and $I_{peak}/I_{sat}$. As shown, the compression ratio reaches a minimum (a lower compression gives more pulse compression) when $I_{peak}/I_{sat}=1$ (i.e., when the peak pulse intensity equals the saturation intensity). In addition, the larger the $\alpha_0 L$ term is the lower the compression ratio.

One embodiment of SA material 25 of FIG. 1 is a composite material containing semiconductor nanocrystals (referred to as "quantum dots") contained in a glass or silicon matrix. Quantum dots interspersed within a matrix material offer an opportunity for an ideal saturable absorber for multiple reasons. For one, the quantum states of the quantum dots can be engineered to correspond to any wavelength simply by altering their size. Further, the density of quantum states (i.e., the number of electrons per unit volume that are able to jump from one quantum state to another) are much lower than in bulk semiconductor materials. Therefore, a lower intensity incident light beam is required for it to saturate. Further, quantum dots eliminate slower excitations that occur at high light intensities such as a two photon absorption that exists in bulk semiconductors. Therefore, the use of quantum dots enables a fast, low power (low intensity), and tunable saturable absorber.

In one embodiment, the quantum dots are comprised of Lead Sulfide, Lead Selenide, Indium Phosphide, Indium Arsenide, etc., and are approximately 5 nanometers in diameter. In a further embodiment, the quantum dots are 5.7 nanometers in diameter. This size of the dots results in a large change of absorption intensity while maintaining fast switching speed. The intensity of light required to saturate SA material 25 depends on the size and composition of the dots, as characterized by the optical cross section of SA material 25. The concentration of dots determines how thick a slab of material (quantum dots in glass) is required to produce a given change in intensity of the signal. In one embodiment, a thickness of 0.1 cm is required to arrive at a 20 dB signal change (assuming 50% saturation). Increasing the dot density allows the same change with a thinner device. The absorption length ($\alpha_0^{-1}$) is related to the optical cross section ($\sigma_0$) and the number density (dots per volume) of dots $N_d$ by:

$$\alpha_0 = N_d \sigma_0 \qquad \text{Eq. 9}$$

A limitation exists to the concentration of dots within the matrix material because it is not possible to pack dots any closer than when they are touching. The densest packing configuration is the face-centered cubic ("FCC") lattice which has a packing density of 0.7.

In one embodiment, the quantum dots are produced in a glass matrix. The glass matrix material is beneficial because it is transparent to the light which is to be absorbed by the dots, and it acts to confine the electron-hole pairs because it has a much larger band gap than the quantum dot material. This quantum confinement allows the requisite absorption spectrum to be obtained. In other embodiments, the matrix material is a plastic, or a semiconductor that is transparent to the operational wavelengths. Other possible matrix materials include Silicate, Borosilicate, and Phosphosilicate glasses, Polymethyl methacrylate (PMMA), Acrylic, polyamine polymers, and semiconductors including Silicon, Silicon Carbide, Cadmium Sulphide, Cadmiun Selenide, Cadmium Telluride, Zinc Sulphide, Aluminum Arsenide, Aluminum Phosphide and Gallium Arsenide.

In one embodiment, cladding is added to the quantum dots. The purpose of the cladding is to greatly increase the optical cross-section of the core semiconductor quantum dot, thus decreasing the optical power required for saturation as well as decreasing the relaxation time. An electrically conducting cladding material (like a metal) locally increases the light intensity within the core semiconductor, thus enhancing the absorption cross section. A semiconductor cladding material acts as a surface passivating agent and reduces the number of trapped states, which increases the absorption cross section.

The band-gap energy of the cladding material is wider than the band-gap of the core semiconductor. In one embodiment, dispersion compensator 10 of FIG. 1 has an operational wavelength of 1500 nm (0.827 eV). In this embodiment, suitable semiconductor cladding materials include Silicon (Si), Silicon Carbide (SiC), Cadmium Sulfide (CdS), Cadmium Selenide (CdSe), Zinc Sulfide (ZnS), Zinc Selenide (ZnSe), Zinc Telluride (ZnTe), AlAs, AlP, AlSb, GaAs and InP. In addition, other materials that include metals such as Ag, Au and Al are appropriate for use as cladding materials.

The thickness of the cladding coating determines the enhancement of the absorption coefficient of the quantum dot material. The parameter describing the coating thickness is the ratio of the core radius to the shell radius ("arat"). Typical values of arat are between 0.7 and 0.85. Thus for core radii between 2.5 nm and 5.0 nm (appropriate for PbS), a shell thickness between 0.5 nm and 2.5 nm gives the desired enhancement.

In one embodiment, the quantum dots are manufactured using a thermal precipitation process that involves dissolving some amount of semiconductor material in a molten glass. The melt is controllably cooled until the quantum dots begin to precipitate out in the form of nano-crystals. A method for manufacturing quantum dots using a thermal precipitation process is disclosed in, for example, P. T. Guerreiro et al., "PbS Quantum-Dot Doped Glasses as Saturable Absorbers for Mode Locking of a Cr:Forsterite Laser", Appl. Phys. Lett. 71 (12), Sep. 22, 1997 at 1595.

In another embodiment, SA material 25 of FIG. 1 is manufactured using a colloidal growth process that involves growing nano-crystal quantum dots in a solution. Specifically, semiconductor precursors are introduced into a heated surfactant solution. The precursors crack in the solution and the semiconductors combine to form the nano-crystals. The quantum dots can then be removed from the solution and combined with a powdered glass solution. The powdered glass, referred to as a "sol-gel" can be shaped into a variety of forms. The sol-gel can be sintered into a large block, drawn and sintered into a fiber, or spun on a substrate and sintered to form a thin film. A method for manufacturing quantum dots using a colloidal growth process is disclosed in, for example: (1) U.S. Pat. No. 5,505,928, entitled "Preparation of III-V Semiconductor Nanocrystals"; (2) Nozik et al., "Colloidal Quantum Dots of III-V Semiconductors", MRS Bulletin, February 1998 at 24; and (3) Hao et al., "Synthesis and Optical Properties of CdSe and CdSe/CdS Nanoparticles", Chem. Mater. 1999, 11 at 3096.

Figure 10:
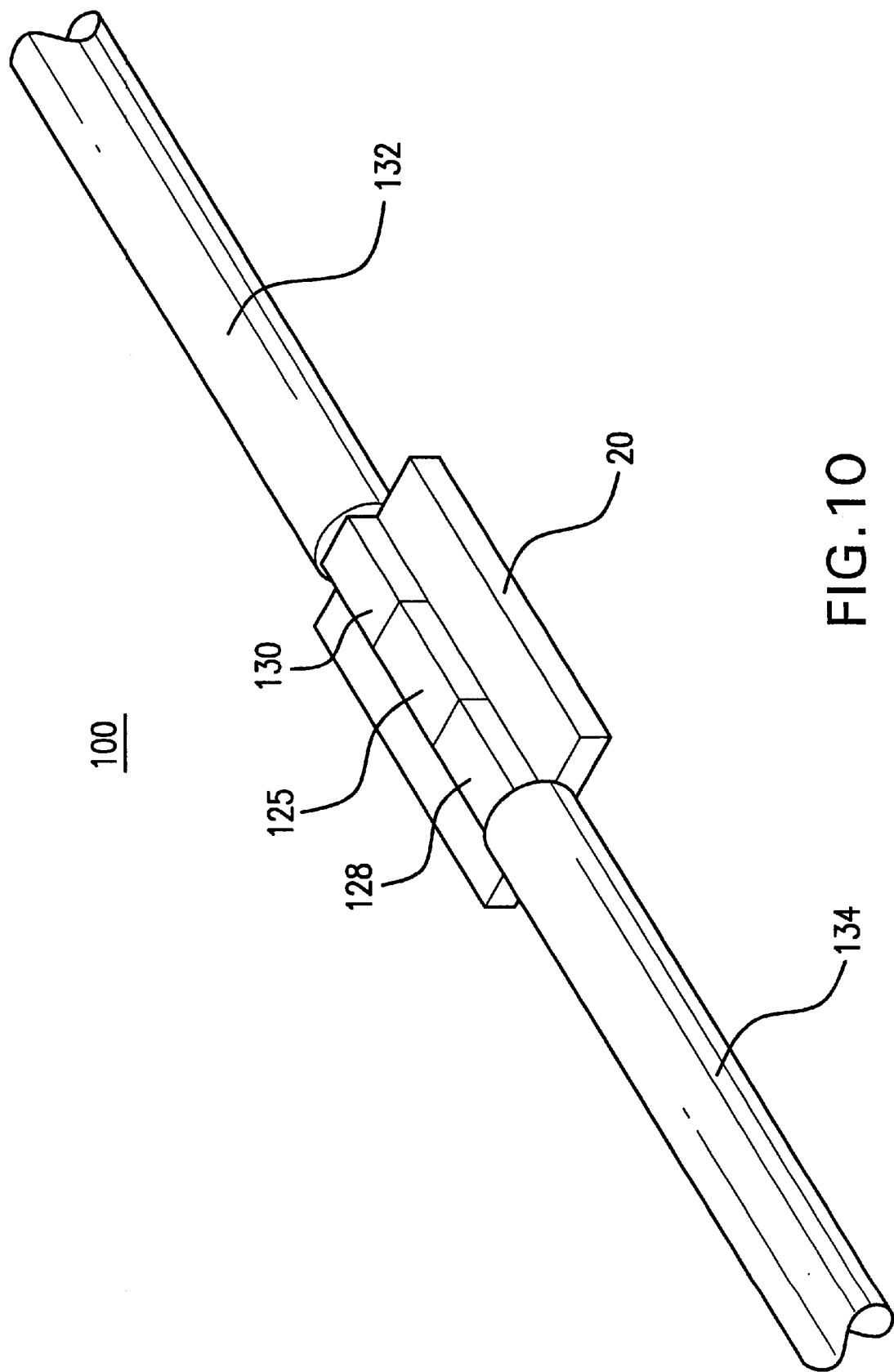
FIG. 10 is a perspective view of an optical dispersion compensator in accordance with another embodiment of the present invention.

FIG. 10 is a perspective view of an optical dispersion compensator in accordance with another embodiment of the present invention. In optical dispersion compensator 100, a saturable absorber material 125, an optical pre-amplifier 128 and an optical post-amplifier 130 are all formed on the same substrate 20. An input fiber 134 is coupled to optical pre-amplifier 128, and an output fiber 132 is coupled to post-amplifier 130.

FIG. 11 is a side view of an optical dispersion compensator in accordance with another embodiment of the present invention. Optical dispersion compensator 110 includes a third continuous wave laser 138 (in addition to optical amplifiers 128 and 130). Bias laser 138 emits at the operational wavelength of dispersion compensator 110. Bias laser 138 can constantly illuminate saturable absorber 125 in order to effectively reduce the saturation intensity of saturable absorber 125, thus reducing the required intensity of optical pre-amplifier 128. Bias laser 138 is coupled perpendicular to saturable absorber 125, either in the plane of the substrate or out of the substrate plane. In another embodiment, shown in FIG. 12, bias laser 138 is coupled directly into the saturable absorber waveguide through an optical coupler 140.

In one embodiment, the peak pulse intensity generated by pre-amplifier 22 of FIG. 1 is equivalent to the saturation intensity of SA material 25 (i.e., the intensity at which the absorption coefficient falls to one half the low-field value) in order to achieve the lowest compression ratio. A lower compression ratio is desirable because it narrows the input pulse the most. In addition, the $\alpha_0 L$ term is high enough to achieve sufficient pulse compression but not high enough to reduce the peak of the optical pulse below the noise floor.

Typical gains exhibited by EDFAs are between 25 and 50 dB with a gain saturation power of 100–200 mW. The gain saturation corresponds to an intensity of 0.5–1 Megawatts per square centimeter. The noise floor due to amplified spontaneous emission of the EDFA is approximately −20 to −30 dBm (0.01 to 0.001 milliwatts). Similarly, the gain exhibited by Semiconductor Optical Amplifiers is approximately 25 dB with a saturation power of only a few milliwatts. Raman amplifiers have similar characteristics as Erbium-Doped Fiber Amplifiers.

In order to maintain light guiding within saturable absorber 25 of FIG. 1, in one embodiment the index of refraction of saturable absorber 25 is greater than that of substrate 20. The cross section of saturable absorber 25 is equivalent to that of the core of fiber amplifiers 22 and 24 to which it is coupled. Typical dimension range spans from 1–10 microns on a side. The length of saturable absorber 25 is such that the peak intensity of the optical pulse does not fall below the noise floor of −20 to −30 dBm, thus the actual length is governed by the low field absorption coefficient and the peak intensity of the optical pulse after passing through the pre-amplifier. Typical low field absorption coefficients of quantum dot saturable absorber material range from 1 cm-1 to 1000 cm-1, therefore, given a peak intensity of 200 mW, the length will range from 10 microns up to 10 cm.

Although the greater the $\alpha_0 L$ term is of Eq. 5 above, the greater the optical pulse is compressed, there is a practical limit to the size of that term. Because optical amplifiers emit noise due to Amplified Spontaneous Emission ("ASE"), the input optical signal can only be attenuated so much by the saturable absorber. In other words, the optical signal entering the saturable absorber cannot be attenuated below that of the noise floor without becoming unrecoverable in the following post-amplification step. The noise floor of an EDFA is approximately −20 dBm to −30 dBm.

Figure 13:
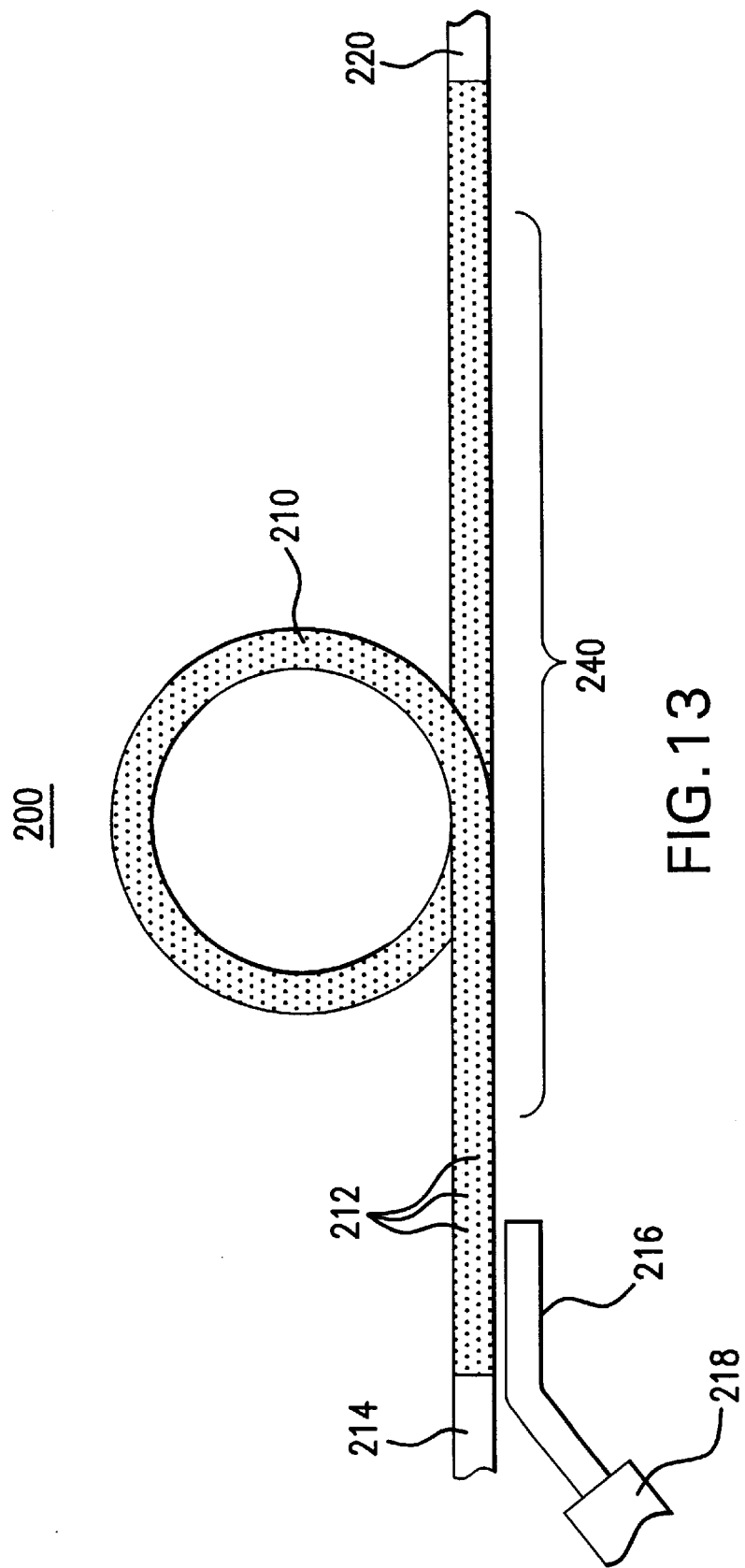
FIG. 13 is a side view of an optical dispersion compensator in accordance with another embodiment of the present invention.

One method to circumvent the previously mentioned limitation is to intersperse the saturable absorber material within the Erbium-Doped Fiber Amplifier. FIG. 13 is a side view of an optical dispersion compensator in accordance with another embodiment of the present invention that achieves this. Optical dispersion compensator 200 combines three elements of dispersion compensator 10 (optical pre-amplifier 22, saturable absorber 25 and optical post-amplifier 24) into a single element 240. The front of element 240 is coupled to a input light source (i.e., an optical fiber 214) and the rear is coupled to an optical output (i.e., an output optical fiber 220). Element 240 includes Quantum dot semiconductor nanoparticles 212 within an optically pumped erbium-doped fiber 210 or other rare earth doped fiber or fiber that is doped to provide an amplifying medium. A pump laser 218 and a coupler 216 provide pump power to fiber 210.

Compensator 200 can achieve pulse compression without reducing the intensity of the peak of the optical pulse, thus circumventing the noise floor limitation described in the previous embodiments. As above, quantum dots 212 consist of small-bandgap semiconductors (including Lead Sulphide, Lead Selenide, etc.) having diameters of approximately 5 nm such that the absorption peak of the quantum dots is that of the operational wavelength of dispersion compensator 200 (i.e., 1550 nm or 1300 nm). Quantum dots 212 are designed to not absorb the optical beam of pump 218. Typically the optical pump beam for an EDFA is either a 980 nm or 1480 nm beam. The concentration of the quantum dots 212 within the fiber are such that the peak power of the optical pulse does not attenuate, thus the concentration of the dots should be high enough that the absorption coefficient of the peak pulse intensity equals the gain coefficient of the fiber amplifier. Therefore, the concentration of the quantum dot particles is governed by the gain of the fiber, the pumping power, and the optical cross section of the quantum dots.

As described, the present invention uses a saturable absorber to compress optical pulse signals and thus provide optical dispersion compensation to the signals. The use of a saturable absorber operates independently of the wavelength composition of the optical pulse, and therefore avoids some of the problems with prior art optical dispersion compensators.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An optical dispersion compensator comprising:
    a saturable absorber having an input and an output;
    a first optical amplifier coupled to said input; and
    a second optical amplifier coupled to said output;
    wherein said saturable absorber receives an optical pulse having tail regions and a central region, and absorbs the tail regions at a higher rate than the central region, and the absorption is performed in accordance with the following equation:

$$I_{out}(t) = (I_{peak})e^{\left(\frac{-t^2}{2\sigma^2}\right)} \times e^{\left(\frac{-\alpha_0 L}{1+\frac{(I_{peak})e^{\left(\frac{-t^2}{2\sigma^2}\right)}}{I_{sat}}} - \alpha_b L\right)}$$

wherein $I_{out}$ is an intensity profile of the optical pulse after passing through the saturable absorber, $I_{peak}$ is a peak of the optical pulse, $I_{sat}$ is an intensity at which an absorption coefficient drops to ½ its low field value, t is a time, $\sigma$ is a standard deviation in units of time, $\alpha_0$ is a low field absorption, $\alpha_B$ is a non-saturating background absorption, and L is a length of the saturable absorber.

2. The optical dispersion compensator of claim 1, further comprising:
    an input optical fiber coupled to said first optical amplifier; and
    an output optical fiber coupled to said second optical amplifier.

3. The optical dispersion compensator of claim 1, wherein said first optical amplifier is an erbium-doped optical amplifier.

4. The optical dispersion compensator of claim 1, wherein said second optical amplifier is an erbium-doped optical amplifier.

5. The optical dispersion compensator of claim 1, wherein said saturable absorber comprises quantum dots.

6. The optical dispersion compensator of claim 5, wherein said quantum dots comprise Lead Sulfide.

7. The optical dispersion compensator of claim 5, wherein said saturable absorber comprises cladding coupled to said quantum dots.

8. The optical dispersion compensator of claim 5, wherein said quantum dots are manufactured using a colloidal growth process.

9. The optical dispersion compensator of claim 1, further comprising a substrate, wherein said saturable absorber is formed on said substrate.

10. The optical dispersion compensator of claim 9, wherein said first optical amplifier and said second optical amplifier are formed on said substrate.

11. The optical dispersion compensator of claim 1, further comprising a bias laser coupled to said saturable absorber.

12. The optical dispersion compensator of claim 11, wherein said saturable absorber forms a first plane, and said bias laser forms a second plane, and wherein said first plane is perpendicular to said second plane.

13. The optical dispersion compensator of claim 11, wherein said bias laser is coupled to said saturable absorber through an optical coupler.

14. The optical dispersion compensator of claim 1, wherein said saturable absorber, first optical amplifier and second optical amplifier are formed from a doped fiber that functions as an amplifying medium and has quantum dot semiconductor nanoparticles, said compensator further comprising:

a pump laser coupled to said doped fiber.

15. The optical dispersion compensator of claim 14, wherein said doped fiber comprises an erbium-doped fiber.

16. An optical dispersion compensator comprising:

a doped fiber comprising quantum dot semiconductor nanoparticles; and a pump laser coupled to said doped fiber;

wherein said doped fiber receives an optical pulse having tail regions and a central region, and saturably absorbs the tail regions at a higher rate than the central region, and the absorption is performed in accordance with the following equation:

$$I_{out}(t) = (I_{peak})e^{\left(\frac{-t^2}{2\sigma^2}\right)} \times e^{\left(\frac{-\alpha_0 L}{1+\frac{(I_{peak})e^{\left(\frac{-t^2}{2\sigma^2}\right)}}{I_{sat}}} - \alpha_b L\right)}$$

wherein $I_{out}$ is an intensity profile of the optical pulse after passing through the doped fiber, $I_{peak}$ is a peak of the optical pulse, $I_{sat}$ is an intensity at which an absorption coefficient drops to ½ its low field value, t is a time, $\sigma$ is a standard deviation in units of time $\alpha_0$ is a low field absorption, $\alpha_B$ is a non-saturating background absorption, and L is a length of the doped fiber.

17. The optical dispersion compensator of claim 16, wherein said doped fiber amplifies the optical pulse.

18. The optical dispersion compensator of claim 16, further comprising:

an input fiber coupled to said doped fiber; and an output fiber coupled to said doped fiber.

19. The optical dispersion compensator of claim 16, wherein said doped fiber comprises an erbium-doped fiber.

20. A method of performing optical dispersion compensation comprising:

receiving an optical pulse having tail regions and a central region; and absorbing the tail regions at a higher rate than the central region in a saturable absorber wherein said absorbing step is performed in accordance with the following equation:

$$I_{out}(t) = (I_{peak})e^{\left(\frac{-t^2}{2\sigma^2}\right)} \times e^{\left(\frac{-\alpha_0 L}{1+\frac{(I_{peak})e^{\left(\frac{-t^2}{2\sigma^2}\right)}}{I_{sat}}} - \alpha_b L\right)}$$

wherein $I_{out}$ is an intensity profile of the optical pulse after passing through the saturable absorber, $I_{peak}$ is a peak of the optical pulse, $I_{sat}$ is an intensity at which an absorption coefficient drops to ½ its low field value, t is a time, $\sigma$ is a standard deviation in units of time, $\alpha_0$ is a low field absorption, $\alpha_B$ is a non-saturating background absorption, and L is a length of the saturable absorber.

21. The method of claim 20, further comprising:

amplifying the optical pulse after the absorbing step.

22. The method of claim 20, further comprising:

amplifying the optical pulse before the absorbing step.

23. The method of claim 20, wherein the absorbing step reduces the width of the optical pulse.

* * * * *